United States Patent
Monden

(10) Patent No.: US 8,358,814 B2
(45) Date of Patent: Jan. 22, 2013

(54) PATTERN INFORMATION REGISTRATION DEVICE, PATTERN INFORMATION REGISTRATION METHOD, PATTERN INFORMATION REGISTRATION PROGRAM AND PATTERN COLLATION SYSTEM

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 1097 days.

(21) Appl. No.: 11/814,362

(22) PCT Filed: Jan. 19, 2006

(86) PCT No.: PCT/JP2006/301164
§ 371 (c)(1),
(2), (4) Date: Jul. 19, 2007

(87) PCT Pub. No.: WO2006/078054
PCT Pub. Date: Jul. 27, 2006

(65) Prior Publication Data
US 2009/0052752 A1    Feb. 26, 2009

(30) Foreign Application Priority Data
Jan. 19, 2005   (JP) ................. 2005-011372

(51) Int. Cl.
*G06K 9/00*    (2006.01)
*G06K 9/46*    (2006.01)
*G06K 9/03*    (2006.01)
*G06F 21/00*   (2006.01)

(52) U.S. Cl. ......... 382/124; 382/201; 382/309; 713/186

(58) Field of Classification Search ............... 382/124, 382/201, 309; 713/186
See application file for complete search history.

(56) References Cited

U.S. PATENT DOCUMENTS

| | | | | |
|---|---|---|---|---|
| 5,933,516 | A  * | 8/1999  | Tu et al. ................. | 382/125 |
| 7,120,278 | B2 * | 10/2006 | Sukegawa et al. ....... | 382/118 |
| 7,158,657 | B2 * | 1/2007  | Okazaki et al. .......... | 382/118 |
| 2002/0176627 | A1* | 11/2002 | Monden ................. | 382/219 |

FOREIGN PATENT DOCUMENTS

| | | |
|---|---|---|
| JP | 63-004381 | 1/1988 |
| JP | 01-131978 | 5/1989 |
| JP | 03-218575 | 9/1991 |
| JP | 6-149980 | 5/1994 |
| JP | 08-263658 | 10/1996 |
| JP | 9-091434 | 4/1997 |
| JP | 11-154230 | 6/1999 |
| JP | 2000-339461 | 12/2000 |
| JP | 2002-288667 | 10/2002 |

* cited by examiner

*Primary Examiner* — Kathleen Y Dulaney
(74) *Attorney, Agent, or Firm* — Dickstein Shapiro LLP

(57) ABSTRACT

A pattern information registration device for selecting and registering pattern information data as an object for determination of registration for use in pattern collation includes unit which forms arbitrary pattern information data having a feature point of the same number as pattern information data of an object for determination, unit which calculates an identification accuracy value indicative of the degree of coincidence between the pattern information data as an object for determination and the arbitrary pattern information data and determines whether the pattern information data as an object for determination is adequate or not based on the identification accuracy value.

41 Claims, 12 Drawing Sheets

FIG. 8
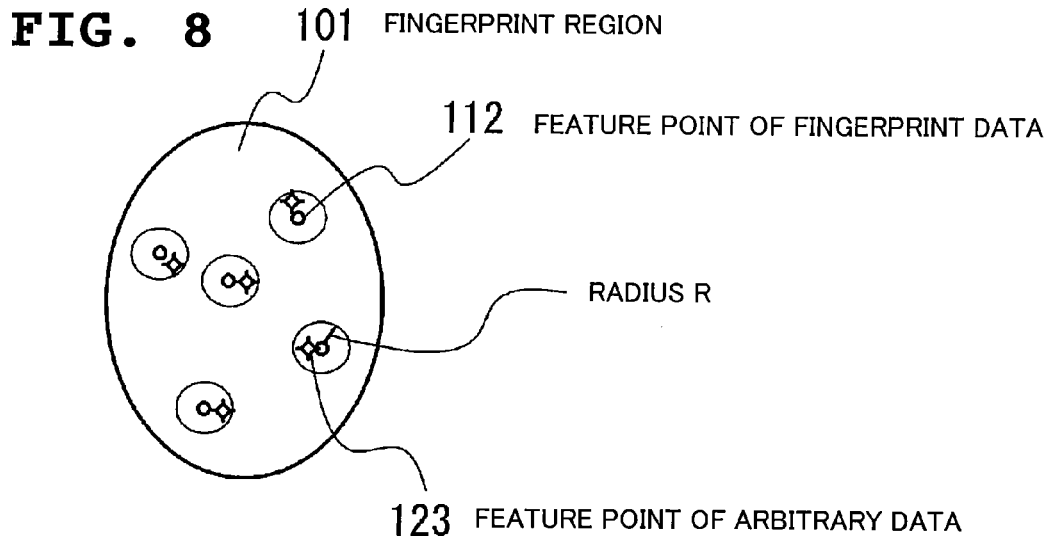
FIG. 9
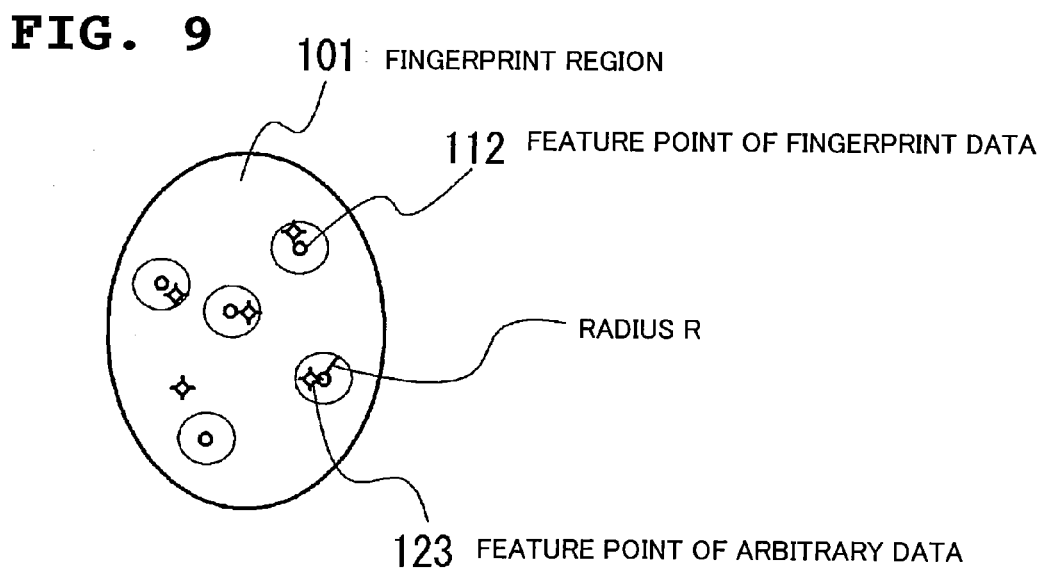
FIG. 10
| PATTERN INFORMATION DATA | AREA S' | RADIUS R | THE NUMBER N OF FEATURE POINTS | IDENTIFICATION ACCURACY VALUE |
|---|---|---|---|---|
| 1 | 100mm² | 1mm | 10 | $9.3 \times 10^{-7}$ |
| 2 | 100mm² | 1mm | 8 | $1.6 \times 10^{-6}$ |

102 FINGERPRINT REGION

123 POINT OF ARBITRARY DATA

103 FINGERPRINT REGION

132 FEATURE POINT

103 FINGERPRINT REGION
132 FEATURE POINT
105 COMMON REGION
FEATURE POINT 131
102 FINGERPRINT REGION

105 COMMON REGION
135 COMMON FEATURE POINT

FEATURE POINT

FEATURE POINT OCCURRENCE DISTRIBUTION

PATTERN INFORMATION REGISTRATION DEVICE, PATTERN INFORMATION REGISTRATION METHOD, PATTERN INFORMATION REGISTRATION PROGRAM AND PATTERN COLLATION SYSTEM

TECHNICAL FIELD

The present invention relates to a pattern information registration device and, more particularly, a pattern information registration device, a pattern information registration method, a pattern information registration program and a pattern collation system for determining whether pattern information data is adequate or not.

BACKGROUND ART

Recognition of pattern information including a fingerprint is widely used as a means for personal identification, crime prevention and the like. When pattern information is used aiming at biometric identification, it is a common practice to register a pattern first to hereafter execute collation based thereon.

With a conventional pattern information registration method, it is difficult to decide a basis for determining whether pattern information data is adequate or not. There is accordingly a problem that pattern information data failing to satisfy accuracy required of a collation device is registered to result in making identification among data difficult when there is a large volume of data. Thus, with a conventional pattern information registration method, it is impossible to determine whether pattern information data is adequate or not.

Examples of methods which solve such a problem are recited in, for example, Japanese Patent Laying-Open No. 8-263658 and for example, Japanese Patent Laying Open No. 2000-339461.

In the method disclosed in Japanese Patent Laying-Open No. 8-263658, which relates to a fingerprint registration method, a normal feature point and a pseudo feature point of a fingerprint are detected to calculate the number of pseudo feature points approximately centered around the normal feature point within a registration window. Then, pseudo feature points within all the registration windows are summed up and divided by the number of registration windows to obtain an average number of pseudo feature points in the registration window. Since pseudo feature points are feature points generated by cracks, crinkling or the like, the smaller the average number of pseudo feature points is, the more adequate an image quality of a fingerprint image is indicated to be. Accordingly, when the average number of pseudo feature points is not more than a threshold value, determination is made that an image quality of an image of a photographed fingerprint is adequate to execute registration processing.

On the other hand, in the method of Japanese Patent Laying Open No. 2000-339461, which relates to a pattern dictionary generation method, an additional dictionary is generated for reinforcing weak points of a pattern dictionary. When generating an additional dictionary, a feature vector of a learning object pattern and a recognition result are input to obtain a nearby region centered around each feature vector. Here, a nearby region is a set of respective feature vectors satisfying a fixed inclusive condition. As an inclusive condition, it is possible, for example, to set feature vectors within a nearby region to be all erroneously read data. Maximum one of thus obtained nearby regions is obtained and written into the additional dictionary.

Other than the above-described methods, the following methods are disclosed.

The feature extraction device recited in Japanese Patent Laying-Open No. 3-218575 considers information necessary for authentication being obtained when the number of feature points obtained by processing a fingerprint image is not less than a predetermined value and executes registration processing.

The fingerprint collation device recited in Japanese Patent Laying-Open No. 63-4381 considers, when the number of feature points obtained by processing a fingerprint image is not more than a predetermined value, that it is an adequate fingerprint with a small number of pseudo feature points and executes registration processing.

In the fingerprint identification determination method recited in Japanese Patent Laying-Open No. 1-131978, feature points of a plurality of fingerprints taken are collated with each other to register one including numbers of common feature points.

The image collation device recited in Japanese Patent Laying-Open No. 11-154230 collates an image with a template already registered and when high coincidence is obtained, registers the image as a new template.

In addition, one example of a pattern collation device is recited in Japanese Patent Laying-Open No. 2002-288667 which executes collation by using a probability of accidental coincidence when comparing with an arbitrary pattern.

The pattern collation device recited in Japanese Patent Laying-Open No. 2002-288667 collates a graphic form to be examined and a model graphic form by using a probability that feature points are more likely to coincide with each other when an arbitrary graphic form and a model graphic form are compared than when the graphic form to be examined and the model graphic form are compared.

The above-described conventional techniques all have the problems set forth below.

The method of Japanese Patent Laying-Open 8-263658 is a method of determining whether pattern information data is adequate or not based on pseudo feature points. Pseudo feature point is different from a feature point (normal feature point) as data of pattern information itself. Determination whether pattern information data is adequate by the method of Japanese Patent Laying-Open No. 8-263658 is not based on feature points of the pattern information data.

Accordingly, since in the method of Japanese Patent Laying-Open 8-263658, determination of adequacy/inadequacy is made based on a pseudo feature point as information not a feature point, it is impossible to determine adequacy/inadequacy of pattern information data with a feature point as information.

On the other hand, the method of Japanese Patent Laying-Open No. 2000-339461 is a method of reinforcing a weak point of a pattern dictionary and not aimed at determining whether pattern information data is adequate.

In addition, the pattern information registration methods recited in Japanese Patent Laying-Open No. 3-218575, Japanese Patent Laying-Open No. 63-4381 and Japanese Patent Laying-Open No. 1-131978 are not for determining whether pattern information data is adequate or not as will be described in the following.

In other words, the methods of Japanese Patent Laying-Open No. 3-218575, Japanese Patent Laying-Open No. 63-4381 and Japanese Patent Laying-Open No. 1-131978 take the size of a fingerprint into no consideration and take only the number of feature points into consideration. When the number of feature points is not less than a fixed number, these methods determine that it is adequate. These methods, however, are not for determining adequacy/inadequacy of pattern information data because no size of a fingerprint is taken into consideration.

The methods of Japanese Patent Laying-Open No. 11-154230 and Japanese Patent Laying-Open No. 2002-288667 are a template registration method and a method of calculating the degree of similarity between a graphic form to be examined and a model graphic form, respectively, and not for determining whether pattern information data is adequate as well.

SUMMARY

An exemplary object of the present invention is to solve the above-described shortcomings of the related art and to provide a pattern information registration device, a pattern information registration method, a pattern information registration program and a pattern collation system by which determination of adequacy/inadequacy of pattern information data is made.

According to an exemplary aspect of the invention, a pattern information registration device for selecting and registering pattern information data as an object for determination of registration for use in pattern collation includes unit which forms arbitrary pattern information data having a feature point of the same number as pattern information data of an object for determination, unit which calculates an identification accuracy value indicative of the degree of coincidence between the pattern information data as an object for determination and the arbitrary pattern information data and determines whether the pattern information data as an object for determination is adequate or not based on the identification accuracy value.

BRIEF DESCRIPTION OF THE DRAWINGS

FIG. 8 is a diagram showing an example in which a feature point of arbitrary data and a feature point of fingerprint data as an object of determination are coincident according to the first exemplary embodiment of the present invention;

FIG. 9 is a diagram showing an example in which a feature point of arbitrary data and a feature point of fingerprint data as an object of determination fail to coincide with each other according to the first exemplary embodiment of the present invention;

FIG. 10 is a diagram for use in explaining a specific example of determining adequacy/inadequacy of pattern information data according to the first exemplary embodiment of the present invention;

EXEMPLARY EMBODIMENT

First Exemplary Embodiment

In the following, preferred exemplary embodiments of the present invention will be described with reference to the accompanying drawings.

Figure 1:
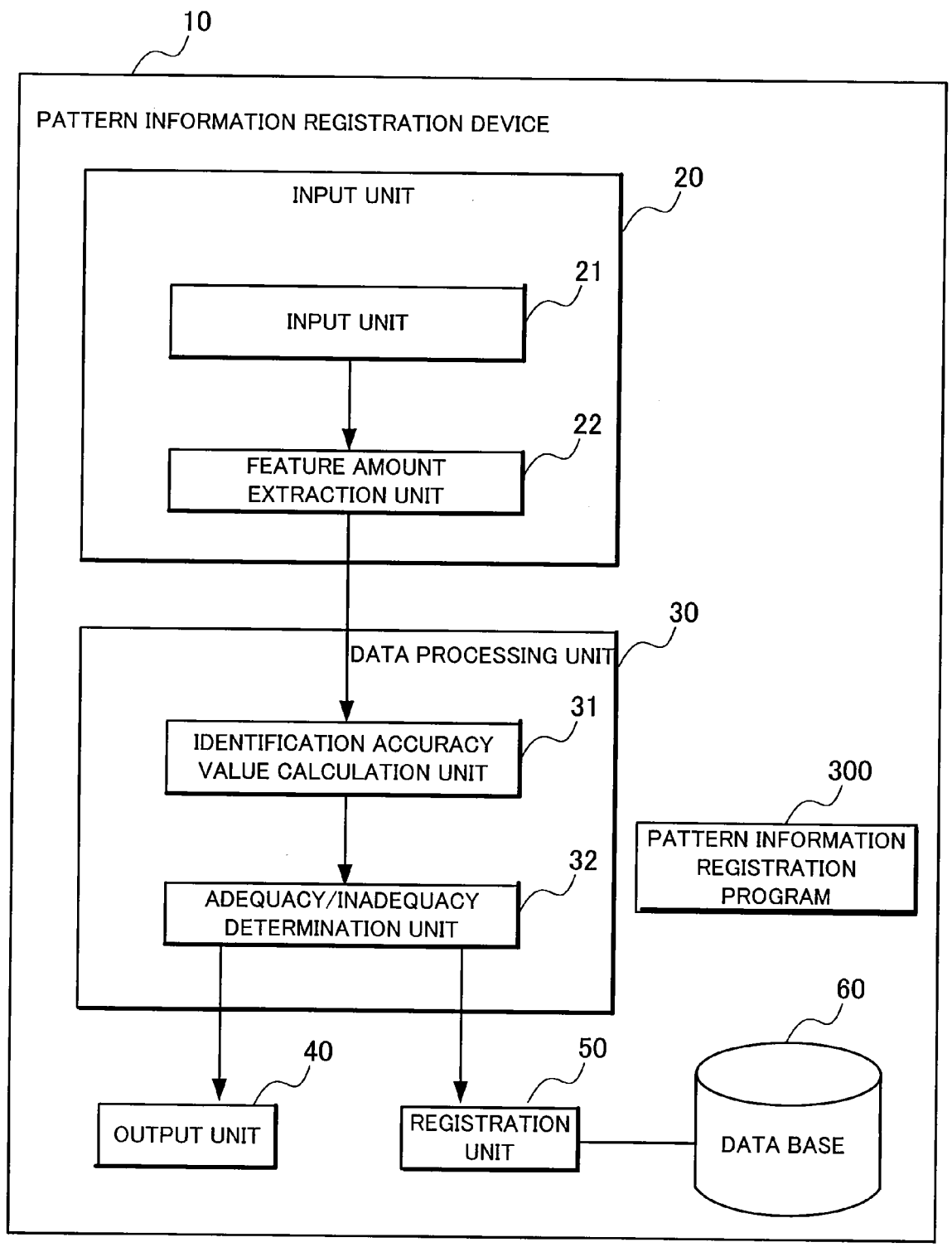
FIG. 1 is a block diagram showing a structure of a pattern information registration device according to a first exemplary embodiment of the present invention.

FIG. 1 is a block diagram showing a structure of a pattern information registration device 10 according to the present exemplary embodiment.

With reference to FIG. 1, the pattern information registration device 10 according to the present exemplary embodiment comprises an input device 20, a data processing unit 30, an output unit 40 and a registration unit 50.

The input device 20 comprises an input unit 21 and a feature amount extraction unit 22. These units substantially operate in the following manner.

The input unit 21, which is realized by a scanner or the like, has a function of receiving input of a fingerprint image, for example, as pattern information data.

The feature amount extraction unit 22 has a function of extracting the amount of features included in pattern information data. The amount of features here is the amount for identifying an image, which includes a feature point and a region of image data.

The amount of features will be described with respect to an example of a fingerprint in FIG. 3.

The data processing unit 30 comprises an identification accuracy value calculation unit 31 and an adequacy/inadequacy determination unit 32.

The identification accuracy value calculation unit 31 is capable of calculating an identification accuracy value of pattern information data input through the input device 20.

The adequacy/inadequacy determination unit 32, which is a unit for determining adequacy/inadequacy of pattern information data, is capable of determining that pattern information data is adequate when an identification accuracy value of the pattern information data obtained by the identification accuracy value calculation unit 31 fails to exceed a predetermined threshold value and determining that the pattern information data is inadequate when the same exceeds the threshold value.

The data processing unit 30 is realized by a computer processing device which executes the functions of the identification accuracy value calculation unit 31 and the adequacy/inadequacy determination unit 32.

The output unit 40 is capable of outputting a result of determination made by the adequacy/inadequacy determination unit 32. The output unit 40 comprises a display or a printer.

The registration unit 50 executes registration processing of pattern information data which is determined to be adequate by the adequacy/inadequacy determination unit 32 and stores already registered data in a data base 60.

Next, operation of the pattern information registration device 10 according to the present exemplary embodiment will be described.

Figure 2:
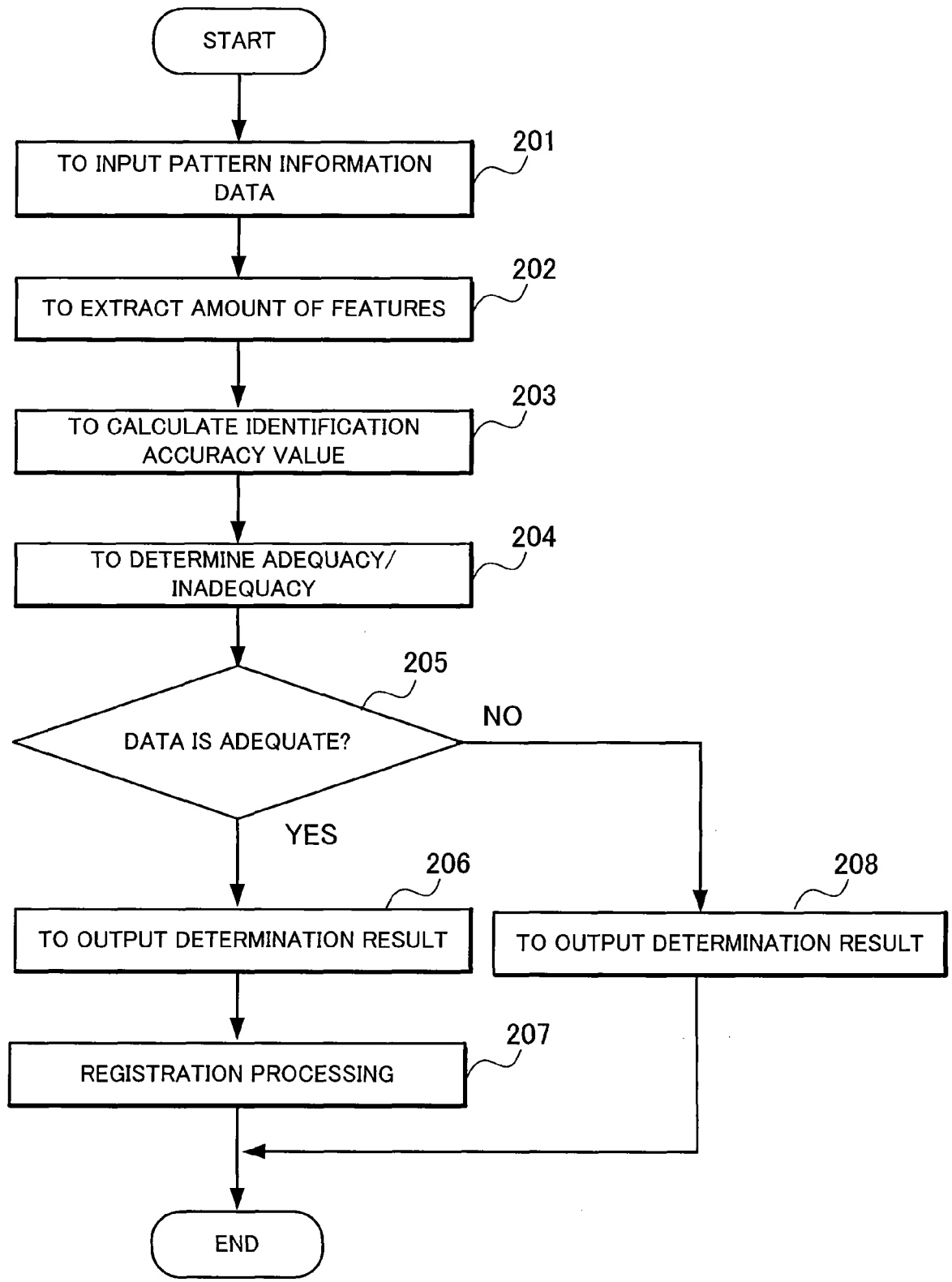
FIG. 2 is a flow chart for use in explaining operation of the pattern information registration device according to the first exemplary embodiment of the present invention.

FIG. 2 is a flow chart for use in explaining operation of the pattern information registration device 10 according to the present exemplary embodiment. Main part of in FIG. 1 will be referred to as required.

First, input pattern information data by the input unit 21 (Step 201) and extract the amount of features by the feature amount extraction unit 22 (Step 202).

The identification accuracy value calculation unit 31 calculates an identification accuracy value by using the amount of features of the pattern information data supplied by the input device 20 (Step 203).

The adequacy/inadequacy determination unit 32 determines that the pattern information data is adequate when the identification accuracy value calculated by the identification accuracy value calculation unit 31 fails to exceed a threshold value and determines that the pattern information data is inadequate when the same exceeds the threshold value (Step 204).

When the determination is made that the pattern information data is adequate (Step 205), the output unit 40 outputs a determination result to the effect that it is adequate (Step 206).

Next, the registration unit 50 executes registration processing of the pattern information data (Step 207) to store already registered data in the data base 60.

On the other hand, when the determination is made that the pattern information data is inadequate (Step 205), the output unit 40 outputs a determination result to the effect that it is inadequate (Step 208).

While the function of calculating an identification accuracy value of pattern information data and determining adequacy/inadequacy of the pattern information data to execute registration processing, which is the characteristic of the present invention, can be realized also by mounting a circuit part with a program realizing such a function incorporated therein on a computer device, it can be also realized as the pattern information registration device 10 by storing a program (application) for realizing the characteristic function of the present invention in a storage medium and executing the program by the computer device.

Next, a specific example of operation of the pattern information registration device 10 according to the present exemplary embodiment will be detailed with reference to FIG. 1. In the present example of operation, description will be made of a case where pattern information is fingerprint data.

In the present example of operation, with the input unit 21 of the input device 20 comprising a fingerprint sensor, a fingerprint image is taken through the fingerprint sensor.

The input device 20 is capable of receiving input of a fingerprint image photographed by the fingerprint sensor or fingerprint data whose features have been extracted through a network. It is also capable of receiving input of a fingerprint image or fingerprint data recorded in the data processing unit or a storage device such as an external memory or a hard disk.

The output unit 40 is capable of not only outputting a result to a display, a printer or the like but also providing other processing device with a determination result through a network. It is also capable of recording a result in the data processing unit or an external memory, a hard disk or the like.

In addition, a storage medium in which already registered data which is recorded in the data base 60 connected to the registration unit 50 is written can be used in other device.

Next, description will be made of an example for determining whether identification accuracy of fingerprint data is adequate or not.

Figure 3:
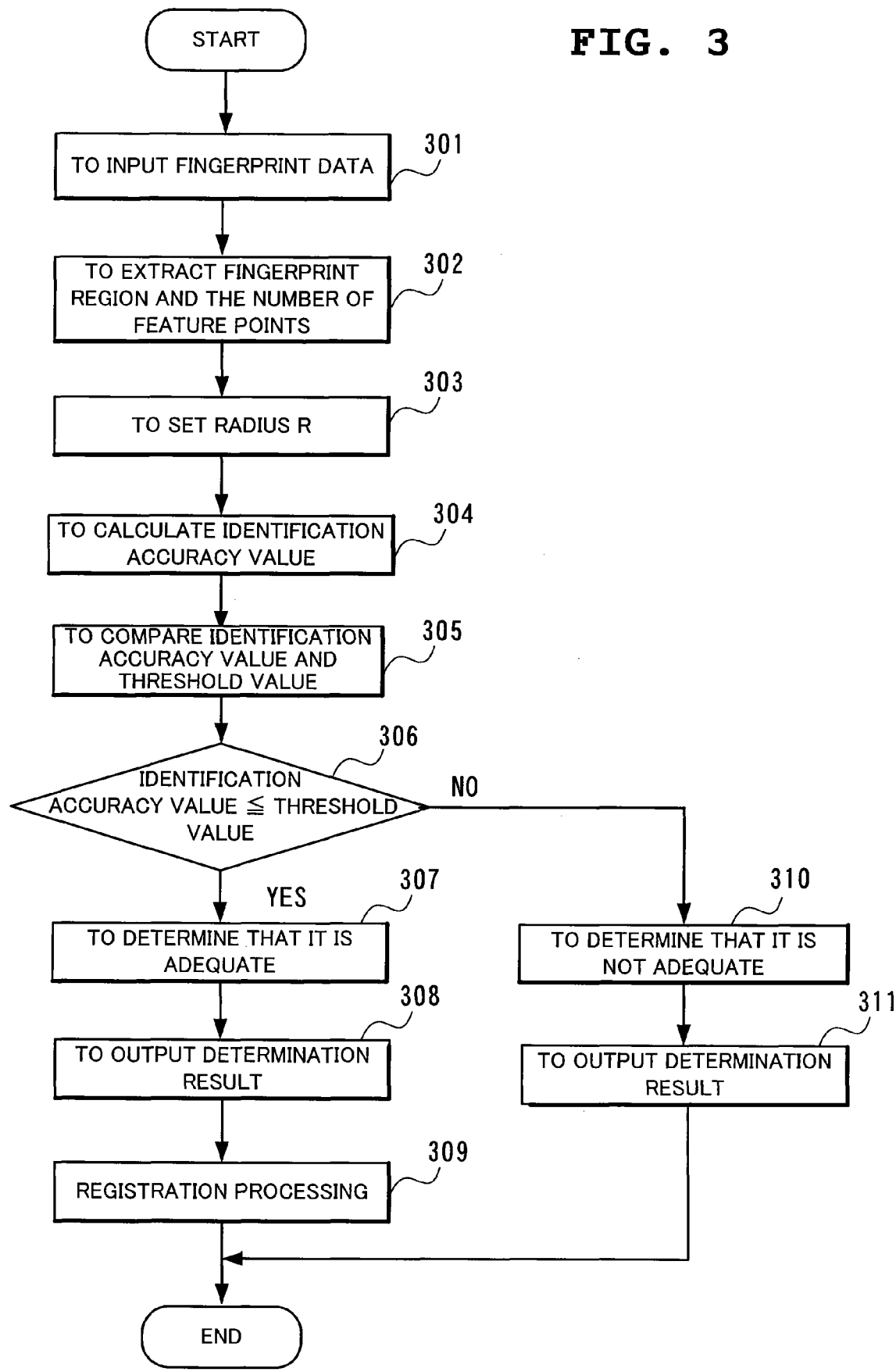
FIG. 3 is a flow chart for use in explaining an example of determining whether fingerprint data identification accuracy is adequate according to the first exemplary embodiment of the present invention.

FIG. 3 is a flow chart for use in explaining an example for determining whether identification accuracy of fingerprint data is adequate or not according to the present exemplary embodiment. Main part of FIG. 1 will be referred to as required.

First, input fingerprint data to the fingerprint sensor which the input unit 21 comprises (Step 301).

Next, the feature amount extraction unit 22 extracts a fingerprint region and the number of feature points as the amount of features for calculating an identification accuracy value (Step 302).

Identification accuracy value that fingerprint data has can be defined by a probability that when the data is compared with other fingerprint data having the same number of feature points, the data will be indistinguishable. It is shown that the smaller the identification accuracy value is, the higher the identification accuracy is and the larger the same is, the lower the identification accuracy is. As to calculation of a probability of being indistinguishable, it will be described in the section of calculation of an identification accuracy value whose description will be made later.

When registering fingerprint data whose identification accuracy is determined to be adequate or inadequate at a pattern authentication system according to the present exemplary embodiment, it is desirable to use, as the amount of features to be used, the amount of features of fingerprint data determined by the pattern information registration device of the present invention. Basis for determining coincidence and lack of coincidence of the amount of features should be also desirably coincident with the basis for determining fingerprint data which is determined by the pattern information registration device of the present invention.

Next, description will be made of a mathematical expression for use in the calculation of an identification accuracy value of fingerprint data.

Although the mathematical expression set forth below is an example with fingerprint data as an object, in a case of pattern information data as an object, completely the same calculation can be made by replacing fingerprint data with pattern information data and replacing a fingerprint region with an image region.

Among the mathematical expressions for calculating an identification accuracy value of fingerprint data set forth below, Expression 1 and Expression 2 are disclosed in Japanese Patent Laying-Open No. 2002-288667.

With a number N2 of feature points existing within a fingerprint region of an area S, when one point is arranged at random within the fingerprint region, a probability that the relevant one point will be within a circle with a radius R centered around any of the number N2 of feature points existing in the fingerprint region is given by the Expression 1.

$$P1 = N2pR2/S \quad \text{(Expression 1)}$$

On the other hand, when a number N1 of points are arranged within the fingerprint region at random, a probability that a number M1 of points will be within a circle with the radius R centered around the respective feature points in the fingerprint region is given by the Expression 2.

$$P2(M1) = N1CM1 \cdot P1M1 \cdot (1-P1 \cdot N1)(N1-M1) \quad \text{(Expression 2)}$$

In the above Expression 1 and Expression 2, it is assumed that because a density of feature points is low, none of circles with the radius R centered around the respective feature points in the fingerprint region overlap with each other.

In the case of the present exemplary embodiment, assuming N1 equals M1 (=N) in the Expression 2, when a number N of points are arranged at random within the fingerprint region, a probability that the number N of points will be within the circles with the radius R centered around the respective features points in the fingerprint region is given by Expression 3.

$$P3(N) = (NpR2/S)N \quad \text{(Expression 3)}$$

Next, calculation of an identification accuracy value will be described.

In the present invention, an identification accuracy value which fingerprint data has is defined by a probability that fingerprint data, in comparison with other fingerprint data having the same number of feature points, will be indistinguishable. The probability, as will be described later, can be calculated as a probability that fingerprint data and arbitrary pattern information data having the same number of feature points as that of the fingerprint data in comparison will coincide with each other.

In the following, arbitrary pattern information data having the same number of feature points as those of the fingerprint data will be abbreviated as arbitrary data.

In the calculation of an identification accuracy value, first, extract an image region and a feature point from pattern information data. Next, form arbitrary data to calculate a probability that pattern information data as an object of determination and the arbitrary data will be indistinguishable. Condition where the two data are indistinguishable occurs when the arbitrary data and the pattern information data as an object of determination coincide with each other. It is therefore apparent that a probability that pattern information data as an object of determination could not be distinguished from arbitrary data is equal to a probability that the arbitrary data and the pattern information data as an object of determination will coincide with each other. It is derived from the foregoing that an identification accuracy value can be obtained by calculating a probability that arbitrary data and pattern information data as an object of determination will coincide with each other.

In this calculation, the arbitrary data is formed by arranging as many points as the feature points of the pattern information data as an object of determination within an image region of the pattern information data at random.

Next, obtain a probability that the above as many points will be arranged in proximity to the feature points of the pattern information data, respectively. In the present exemplary embodiment, the probability is calculated assuming that the proximity to the feature point is a region within a range of the radius R centered around the feature point.

Figure 4:
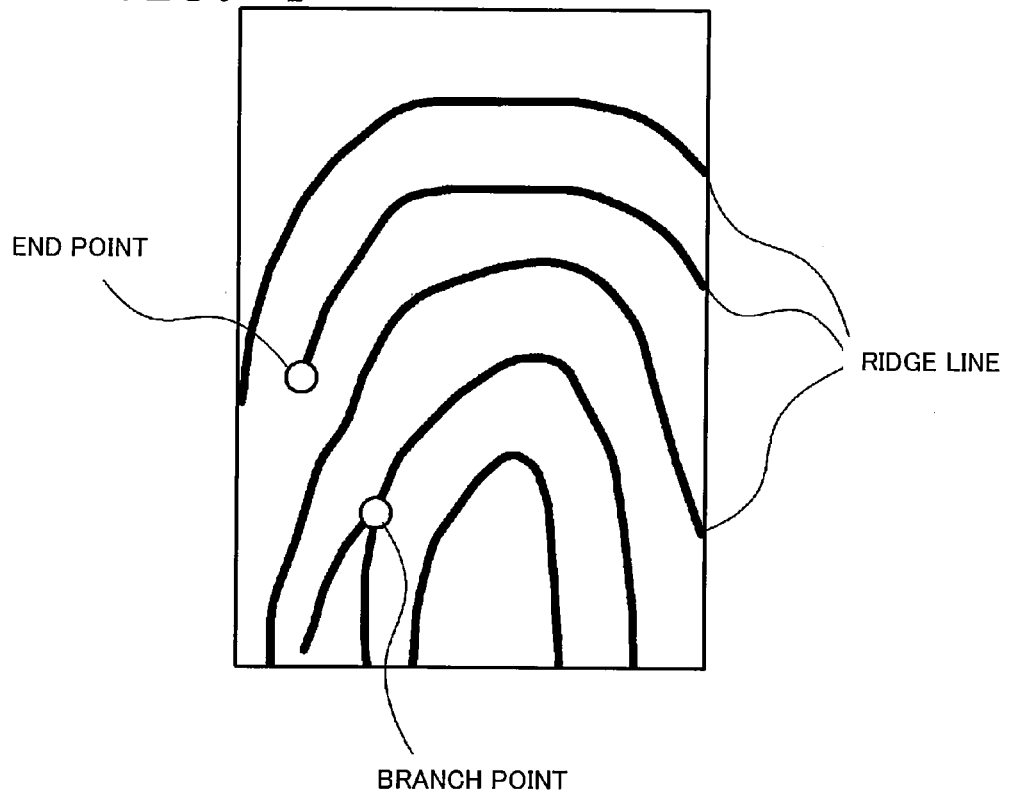
FIG. 4 is a diagram showing a feature point of fingerprint data as an object of determination according to the first exemplary embodiment of the present invention.

FIG. 4 is a diagram showing a feature point of fingerprint data as an object of determination according to the present exemplary embodiment.

With reference to FIG. 4, an end point and a branch point as feature points of the fingerprint data are seen one each.

Figure 5:
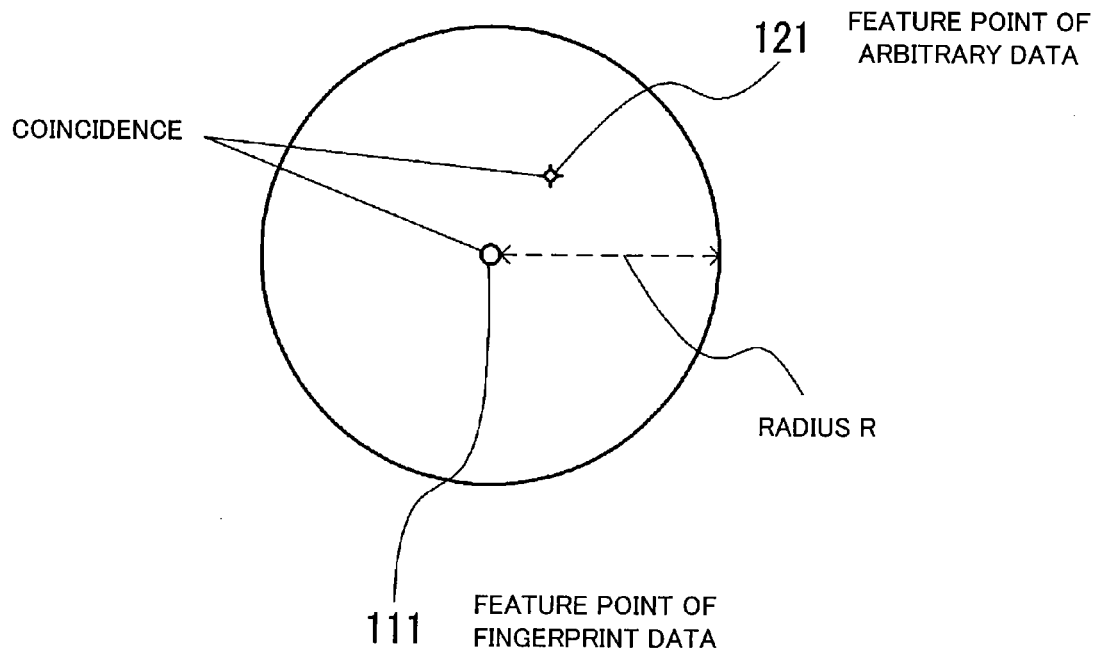
FIG. 5 is a diagram showing an example of determining that a position of a feature point of fingerprint data as an object of determination and a position of a feature point of arbitrary data are coincident according to the first exemplary embodiment of the present invention.

FIG. 5 is a diagram showing an example of determining that a position of a feature point 111 of fingerprint data as an object of determination and a position of a feature point 121 of arbitrary data are coincident with each other according to the present exemplary embodiment. The figure is expansion of a part of an image with fingerprint data and data for comparison overlapping with each other.

With reference to FIG. 5, the feature point 121 of the arbitrary data is located in a region within a range of the radius R centered around the feature point 111 of the fingerprint data and in such a case, determination is made that the feature point 121 of the arbitrary data is the same point as the feature point 111 of the fingerprint data.

Figure 6:
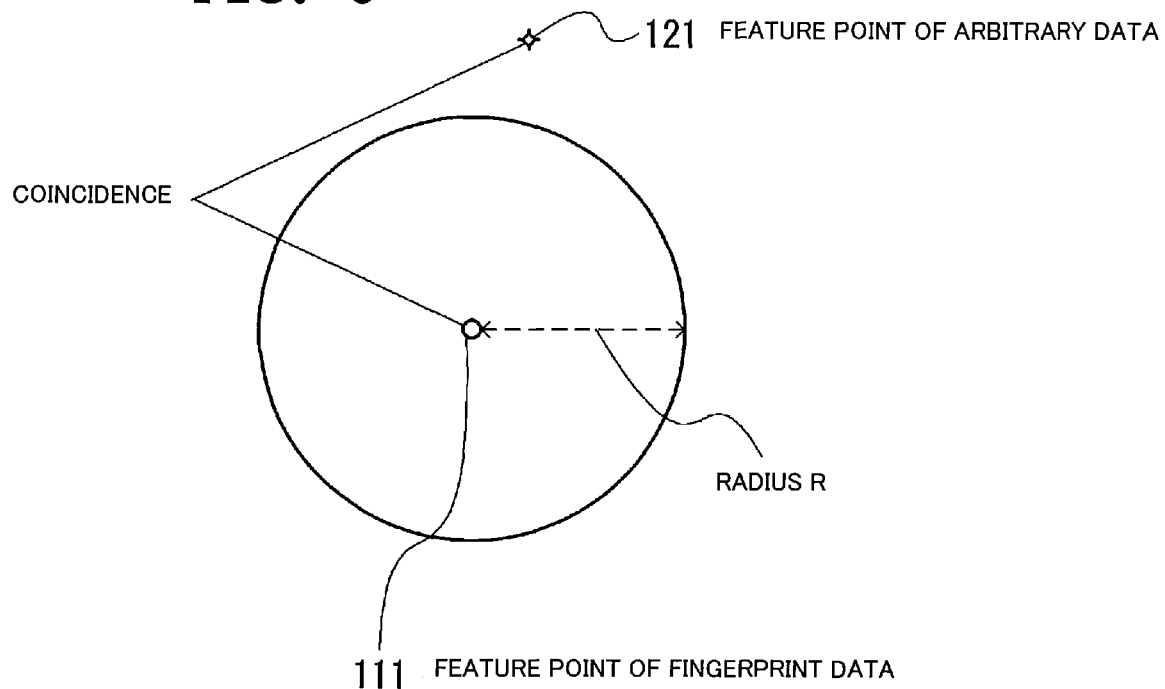
FIG. 6 is a diagram showing an example of determining that a position of a feature point of arbitrary data and a position of a feature point of fingerprint data as an object of determination fail to coincide with each other according to the first exemplary embodiment of the present invention.

FIG. 6 is a diagram showing an example of determining that the position of the feature point 121 of arbitrary data and the position of the feature point 111 of fingerprint data as an object of determination fail to coincide with each other according to the present exemplary embodiment.

With reference to FIG. 6, the feature point 121 of the arbitrary data is located outside of a region within a range of the radius R centered around the feature point 111 of the fingerprint data and in such a case, determination is made that the position of the feature point 121 of the arbitrary data fails to coincide with the position of the feature point 111 of the fingerprint data.

As described above, in the present invention, an identification accuracy value of fingerprint data is defined by a probability that the fingerprint data will be indistinguishable from arbitrary data in comparison. Taking into consideration that being indistinguishable between fingerprint data and arbitrary fingerprint data means that the two data are coincident, an identification accuracy value of the fingerprint data can be obtained by calculating a probability that the two will be coincident with respect to a feature point of actual fingerprint data.

Figure 7:
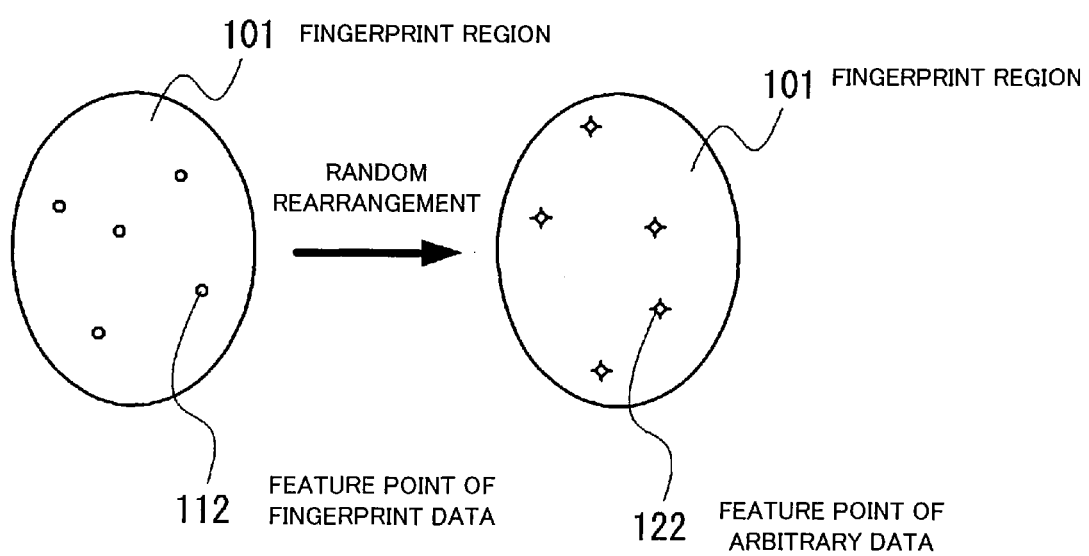
FIG. 7 is a diagram showing how a feature point of arbitrary data is formed according to the first exemplary embodiment of the present invention.

FIG. 7 is a diagram showing how a feature point 122 of arbitrary data according to the present exemplary embodiment is formed.

It can be seen from FIG. 7 that five feature points 122 of fingerprint data exist in a fingerprint region 101. In order to obtain a probability that the feature points 122 of the arbitrary data will coincide with the feature points of the fingerprint data, five feature points 112 of the fingerprint data are rearranged at random. By the rearrangement, the feature points 112 of the fingerprint data move to the positions of the feature points 122 of the arbitrary data.

Thus, preparation is made for calculating an identification accuracy value.

Next, a radius R of a circle is set by the identification accuracy value calculation unit 31 for determining, when the feature point 122 of the arbitrary data is inside a circle centered around the feature point of the fingerprint data 112, that the feature point 122 of the arbitrary data and the feature point of the fingerprint data 112 are coincident and determining, when the feature point 122 of the arbitrary data is outside a circle centered around the feature point of the fingerprint data 112, that the two data fail to coincide (Step 303).

FIG. 8 is a diagram showing an example where the feature point 122 of the arbitrary data and the feature point 112 of the fingerprint data are coincident according to the present exemplary embodiment.

With reference to FIG. 8, it can be seen that all of the feature points 123 of the arbitrary data are in a region within a range of the radius R centered around the feature point 112 of the fingerprint data and that a position of each of the feature points 123 of the arbitrary data and a position of each of the feature points 112 of the fingerprint data are coincident at every feature point.

The probability that the state shown in FIG. 8 will be realized can be calculated by setting the radius R by the above-described Expression 3.

FIG. 9 is a diagram showing an example in which the feature point 123 of the arbitrary data and the feature point 112 of the fingerprint data fail to coincide with each other according to the present exemplary embodiment. Among the feature points of the arbitrary data 123, one feature point is located outside of a region within a range of the radius R centered around the feature point of the fingerprint data 112, so that the feature point 123 of the arbitrary data and the feature point 112 of the fingerprint data fail to coincide with each other.

Thus, by calculating a probability that the feature point 122 of the arbitrary data and the feature point 112 of the fingerprint data will coincide with each other, an identification accuracy value of the fingerprint data is calculated by the identification accuracy value calculation unit 31 (Step 304).

The adequacy/inadequacy determination unit 32 compares the identification accuracy value calculated by the identification accuracy value calculation unit 31 with a predetermined threshold value (Step 305).

As a result of the comparison between the identification accuracy value and the threshold value (Step 306), when the probability calculated by the identification accuracy value calculation unit 31 is smaller than the threshold value, that is, when the identification accuracy value is smaller than the threshold value, the adequacy/inadequacy determination unit 32 determines that it is adequate fingerprint data with high identification accuracy (Step 307).

To the fingerprint data determined to have high identification accuracy, a determination result to the effect that the data is adequate is output by the output unit 40 (Step 308).

Next, registration processing is executed by the registration unit 50 (Step 309).

On the other hand, when the probability calculated by the identification accuracy value calculation unit 31 is larger than the threshold value, that is, when the identification accuracy value is larger than the threshold value, the adequacy/inadequacy determination unit 32 determines that it is not adequate fingerprint data with low identification accuracy (Step 310).

To the fingerprint data determined to have low identification accuracy, a determination result to the effect that the data is not adequate is output by the output unit 40 (Step 311).

While in the above-described example, the description has been made of a case where the number of feature points is five as shown in FIG. 7, in case where the number of feature points is changed, for example, where the number of feature points is one, a probability that arbitrary data will coincide with fingerprint data will be increased. Accordingly, the identification accuracy value will be increased to lower identification accuracy.

On the other hand, when the number of feature points is large, a probability that arbitrary data will coincide with fingerprint data will be decreased to increase identification accuracy.

Thus, the present exemplary embodiment enables calculation of an identification accuracy value even when the number of feature points as the amount of information is changed.

As described in the foregoing, the pattern information registration device 10 of the present exemplary embodiment is a device for selectively registering pattern information data whose registration is to be determined for use in pattern collation, which forms arbitrary pattern information data having the same number of feature points as those of the pattern information data as an object of determination and calculates an identification accuracy value indicative of the degree of coincidence between the pattern information data as an object of determination and the arbitrary pattern information data to determine whether the pattern information data as an object of determination is adequate or not based on the identification accuracy value.

It is also for forming arbitrary pattern information data by random arrangement of the same number of feature points as those of pattern information data as an object of determination within a predetermined region thereof and when the same number of feature points are arranged in proximity to the feature points of the pattern information data as an object of determination, respectively, considering that the arbitrary pattern information data coincides with the pattern information data as an object of determination to calculate an identification accuracy value.

As a threshold value, usable is a false match rate (FMR) required of an authentication device which uses, for authentication, fingerprint data registered by the fingerprint registration system of the present invention. When an identification accuracy value coincides with FMR required of the authentication device, no problem occurs in particular.

With data whose identification accuracy value is larger than FMR required of the authentication device, accuracy for proper discrimination from other's fingerprint runs short, so that an authentication accuracy value of the authentication device can not be maintained at a desired authentication accuracy value. Such a situation is similar to, for example, registration of three-digit personal identification number at a four-digit personal identification number system which is required to suppress a probability that a personal identification number will be indistinguishable from other personal identification numbers below one-ten-thousandth. In other words, it is clear that even if three-digit personal identification number is registered at a four-digit personal identification number system, authentication accuracy of the authentication device will be reduced.

As a threshold value for determining adequacy/inadequacy, FMR required of the authentication device may be used as it is or a value obtained by multiplying FMR by an appropriate safety factor (less than 1) may be used.

As to the radius R of a circle, because it is calculated by the Expression 1 and the Expression 2 assuming that circles centered around respective feature points fail to overlap with each other, it is preferable to set a value smaller than a radius of a circle having a one-tenth area of an area calculated by dividing an area of a fingerprint region by the number of feature points.

Also when pattern information other than a fingerprint is used, it is preferable to set a value smaller than a radius of a circle having a one-tenth area of an area calculated by dividing an area of an image region by the number of feature points.

According to thus described pattern information registration device 10 according to the present exemplary embodiment, an identification accuracy value which reflects adequacy/inadequacy of identification accuracy can be calculated by using only pattern information data as an object of determination. The smaller an identification accuracy value becomes, the higher identification accuracy becomes and the larger it becomes, the lower the identification accuracy becomes. In a case of a fingerprint having numbers of feature points, for example, the identification accuracy value calculated by the Expression 3 is small, so that the identification accuracy is high. In a case of a fingerprint having a small number of feature points, identification accuracy value calculated by the Expression 3 is large, so that the identification accuracy is low. Thus, by using only pattern information data as an object of determination, the present exemplary embodiment enables determination of its adequacy/inadequacy.

Next, determination of adequacy/inadequacy of pattern information data will be described with respect to a specific example.

FIG. 10 is a diagram for use in explaining a specific example of adequacy/inadequacy determination of pattern information data according to the present exemplary embodiment.

With reference to FIG. 10, shown is a specific example of adequacy/inadequacy determination as to two pattern information data (1) and (2). As to the two pattern information data (1) and (2), an area S is set to be 100 mm2 and a radius R is set to be 1 mm. In addition, the number of feature points included in the pattern information data (1) is ten and the number of feature points included in the pattern information data (2) is eight. Also set in this example is $1 \times 10^{-6}$ as a threshold value of an identification accuracy value for determining adequacy/inadequacy.

In the above-described specific example, the identification accuracy value calculated by the Expression 3 will be $9.3 \times 10^{-7}$ for the pattern information data (1) and $1.6 \times 10^{-6}$ for the pattern information data (2).

In this case, since the threshold value of the identification accuracy value for adequacy/inadequacy determination is set to be $1 \times 10^{-6}$, it will be determined at a determination step that the pattern information data (1) is registrable and the pattern information data (2) is not registrable.

Calculation of an identification accuracy value described in the present exemplary embodiment is unique concept. As described above, since the identification accuracy value is calculated by a probability that when the same number of feature points as those of pattern information data as an object of determination are arranged at random, they will coincide with those of the pattern information data as an object of determination, it is necessary, for realizing a condition of coincidence, to change arrangement of the same number of feature points as many times as an inverse number of a probability of coincidence. Assuming an identification accuracy value to be 0.01, for example, among 100 pattern information data obtained by changing arrangement 100 times, one data will exist which is coincident with the pattern information data as an object of determination. With an identification accuracy value of 0.01, it will be accordingly possible to distinguish from among approximately 100 data. Similarly, in a case of an identification accuracy value of 0.001, it will be possible to distinguish among approximately 1000 data. Thus, an inverse number of an identification accuracy number will give an approximate number of identifiable data. In other words, the identification accuracy value can be considered to indicate identification capability that pattern information data has.

The identification accuracy value described in the present exemplary embodiment is unique concept which can be applied in combination with other method as will be described in the following. The identification accuracy value can be determined by other empirical method. Other method, however, is an empirical method using test data. Therefore, comparing data obtained by the method described in the present exemplary embodiment with data obtained by other empirical method in advance enables the same result as that of other empirical method to be obtained thereafter only by inputting pattern information data as an object of determination. When comparing data obtained by the method described in the present exemplary embodiment with data obtained by other empirical method, adjustment of the radius R in the Expression 1 makes it easy to attain conformity with other data.

In addition, by making the most of an advantage that just input of pattern information data as an object of determination enables calculation of an identification accuracy value, application is possible as a means (*) for standardization for fixing a basis for identification accuracy of pattern information data.

Although the above-described exemplary embodiment has been described with respect to a case where feature points are an end point and a branch point of a fingerprint, the present exemplary embodiment is similarly applicable when a feature point is other than those described above.

Thus described exemplary embodiments enable selection of pattern information data suitable for pattern collation.

The reason is that by the calculation of an identification accuracy value of pattern information data, adequacy/inadequacy of identification accuracy of the pattern information data is determined.

Another effect is enabling selection of pattern information data suitable for pattern collation irrespective of the amount of information (e.g. the number of feature points) of the pattern information data.

The reason is that an identification accuracy value is calculated according the amount of information of the pattern information data.

A further effect is enabling adequacy/inadequacy of identification accuracy to be determined using only pattern information data as an object of determination.

The reason is that an identification accuracy value is calculated only by the pattern information data as an object of determination.

Second Exemplary Embodiment

Next, a second exemplary embodiment of the present invention will be described with reference to the drawings.

Figure 11:
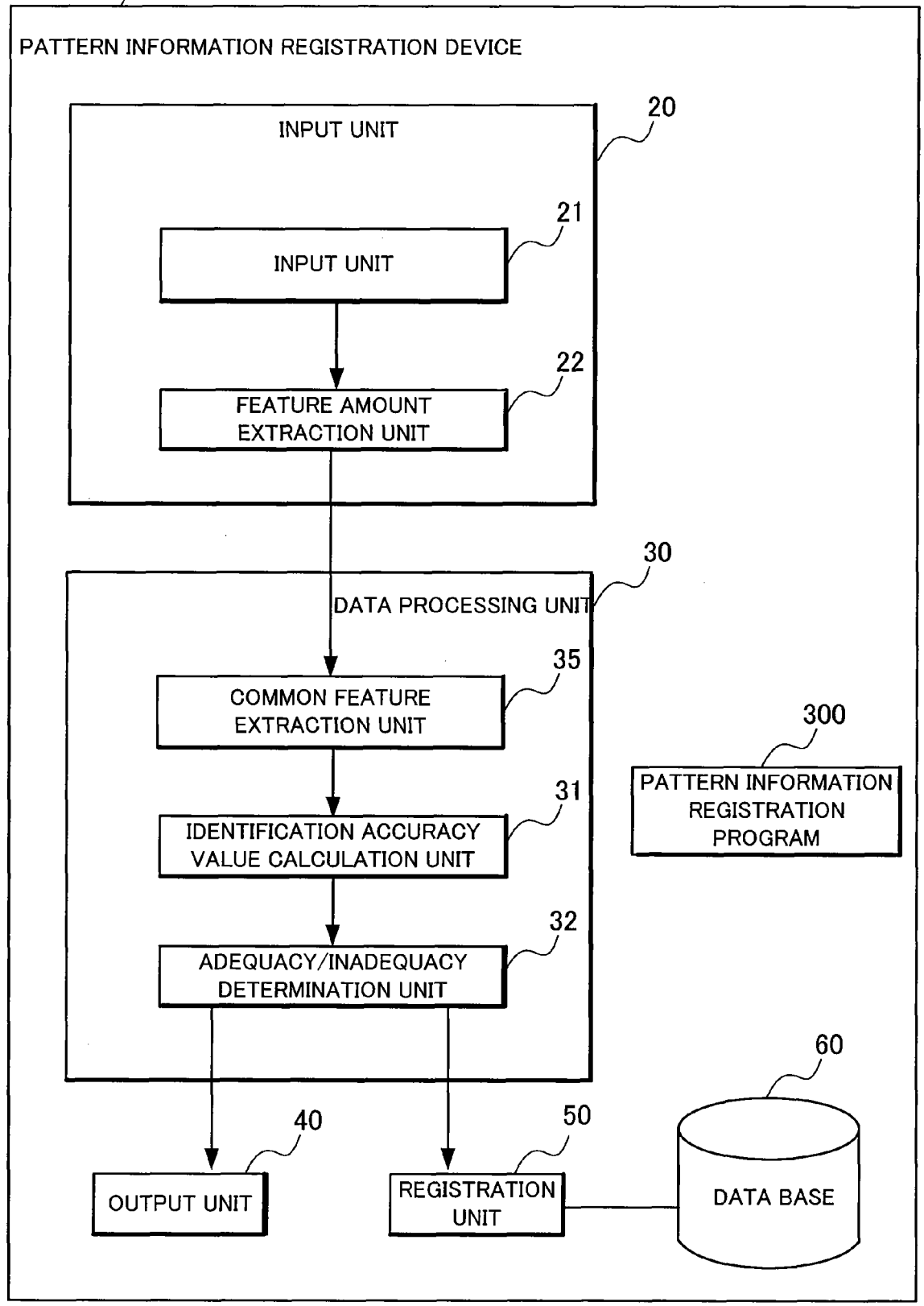
FIG. 11 is a block diagram showing a structure of a pattern information registration device according to a second exemplary embodiment of the present invention.

FIG. 11 is a block diagram showing a structure of a pattern information registration device 15 according to the present exemplary embodiment.

With reference to FIG. 11, the pattern information registration device 15 according to the present exemplary embodiment is realized by adding a common feature extraction unit 35 to the components of the data processing unit 30 of the pattern information registration device 10 according to the first exemplary embodiment of the present invention.

The input device 20 receives input of pattern information a plurality of times and supplies the data processing unit 30 with the input plurality of pattern information data and feature amount data thereof.

The common feature extraction unit 35 is capable of extracting features included in common in the plurality of pattern information data taken by the input device 20.

Upon extracting the features included in common in all the input plurality of pattern information data, the common feature extraction unit 35 selects two pattern information data whose information are highly in common. When the number of pattern information data input is two, two pattern information data will be objects for selection. When the number of pattern information data input is three, two or three pattern information data whose information are highly in common will be objects for selection among the three data.

The number of pattern information data to be selected may be three or more when the number of input data is three or more.

From thus selected two pattern information data, features included in common in these two pattern information data are extracted to then calculate an identification accuracy value by the identification accuracy value calculation unit 31.

Next, operation of the pattern information registration device 15 according to the exemplary embodiment will be described.

Figure 12:
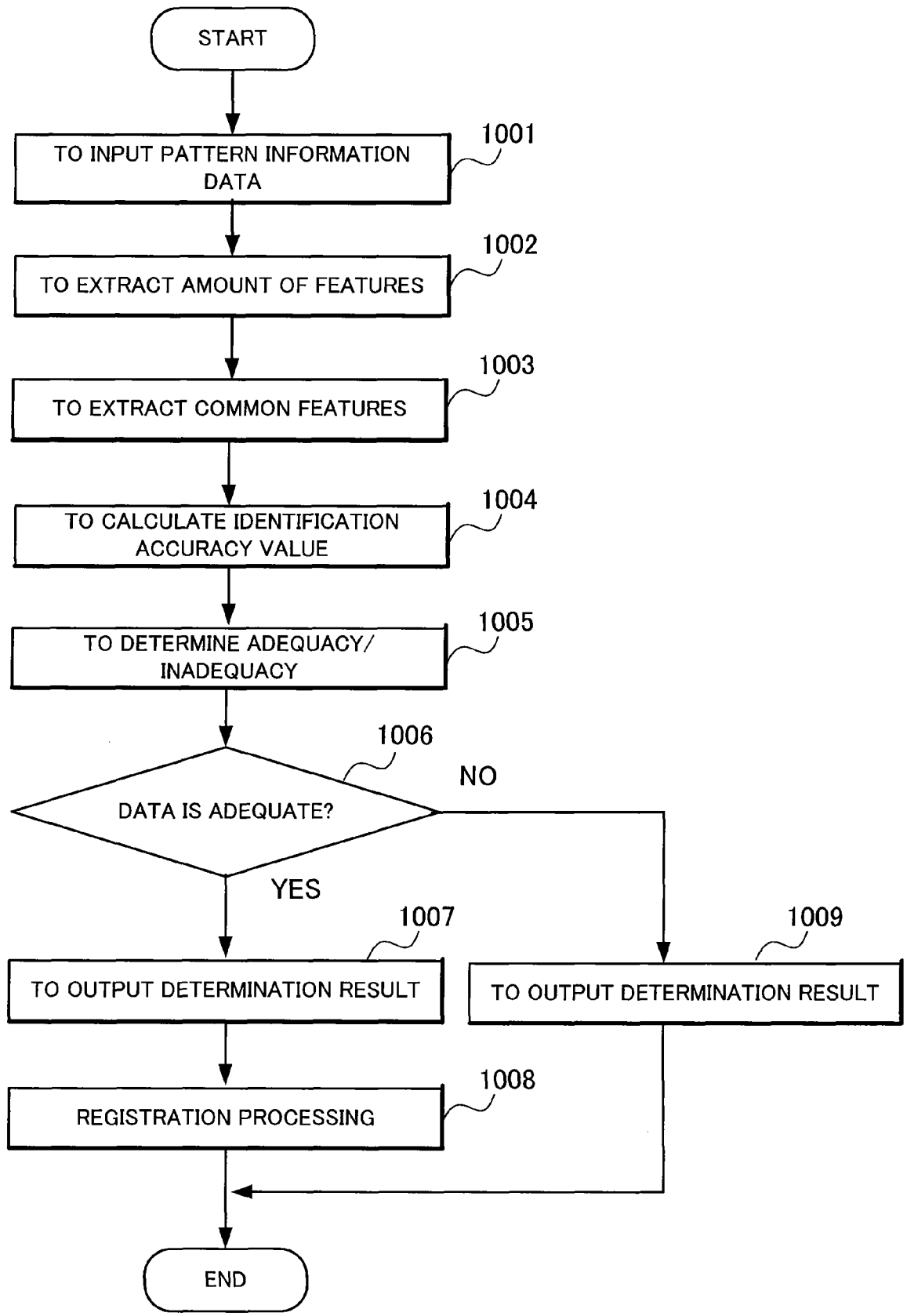
FIG. 12 is a flow chart for use in explaining operation of the pattern information registration device according to the second exemplary embodiment of the present invention.

FIG. 12 is a flow chart for use in explaining operation of the pattern information registration device 15 according to the present exemplary embodiment. Main part of FIG. 11 will be referred to as required.

First, input pattern information data by the input unit 21 (Step 1001) and extract its amount of features by the feature amount extraction unit 22 (Step 1002).

The common feature extraction unit 35 extracts the amount of common features included in a plurality of pattern information data and supplies the same to the identification accuracy value calculation unit 31 (Step 1003).

The identification accuracy value calculation unit 31 calculates an identification accuracy value of pattern information data by using the amount of common features extracted by the common feature extraction unit 35 (Step 1004).

The adequacy/inadequacy determination unit 32 determines that pattern information data is adequate when an identification accuracy value calculated by the identification accuracy value calculation unit 31 is not more than a threshold value and determines that the pattern information data is inadequate when the same exceeds the threshold value (Step 1005).

When determination is made that the pattern information data is adequate (Step 1006), a determination result to the effect that it is adequate is output by the output unit 40 (Step 1007).

Next, the registration unit 50 executes registration processing of the pattern information data (Step 1008) to store data necessary for registration in the data base 50.

On the other hand, when the determination is made that the pattern information data is inadequate (Step 1006), a determination result to the effect that it is inadequate is output by the output unit 40 (Step 1009).

Since in the present exemplary embodiment, the common feature extraction unit 35 selects a plurality of highly common data among the input plurality of pattern information data to extract the amount of features of the plurality of data, an effect exerted by variation of data can be mitigated to enable more accurate determination of adequacy/inadequacy than in a case where the amount of features of one pattern information data is used.

Next, description will be made of a specific example of operation of the pattern information registration device 15 according to the present exemplary embodiment. In the present exemplary embodiment, fingerprint data is input twice.

Figure 13:
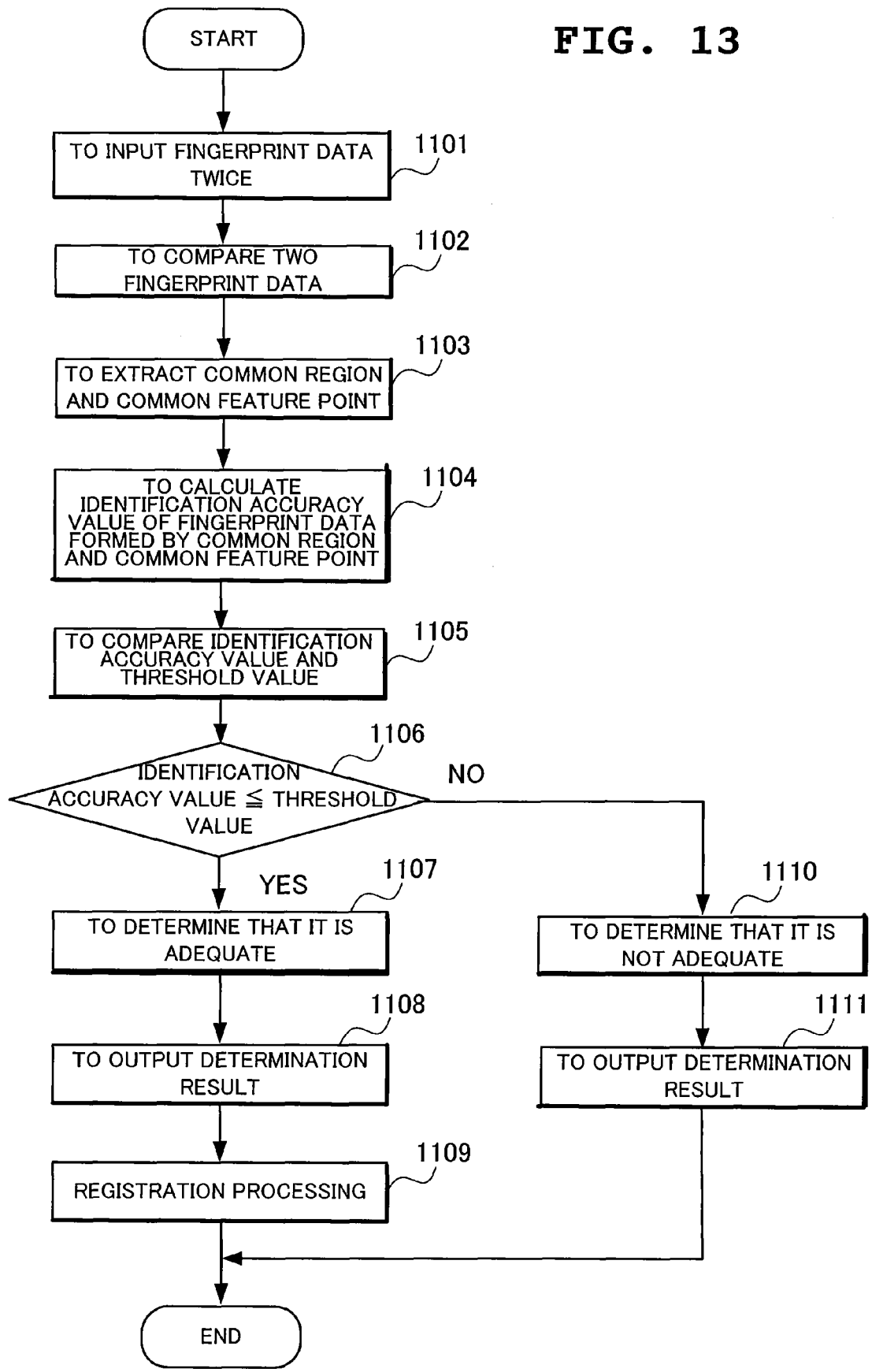
FIG. 13 is a flow chart for use in explaining an example of operation of the pattern information registration device according to the second exemplary embodiment of the present invention.

FIG. 13 is a flow chart for use in explaining an example of operation of the pattern information registration device 15 according to the present exemplary embodiment. Main part of FIG. 11 will be referred to as required.

The input unit 20 receives input of fingerprint data twice (Step 1101) to provide the data processing unit 30 with the amount of features.

The data processing unit 30 compares two fingerprint data by the common feature extraction unit 35 (Step 1102).

Figure 14:
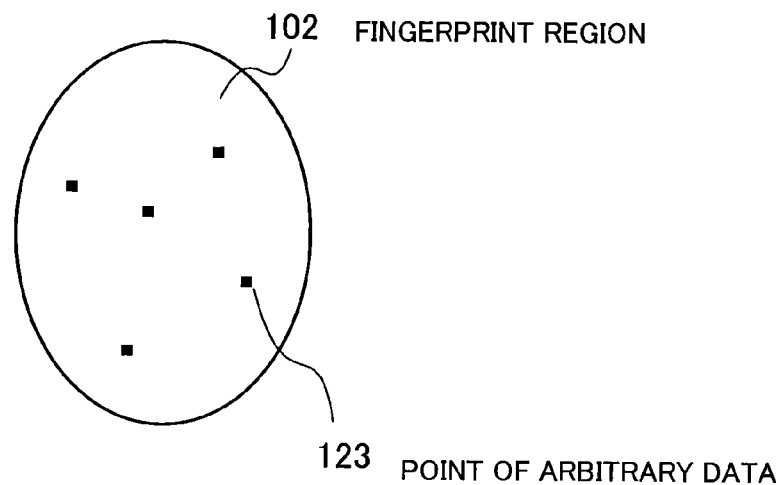
FIG. 14 is a diagram showing fingerprint data input first according to the second exemplary embodiment of the present invention.

FIG. 14 is a diagram showing fingerprint data input first according to the present exemplary embodiment. It is seen that five arbitrary data points 123 exist within a fingerprint region 102.

Figure 15:
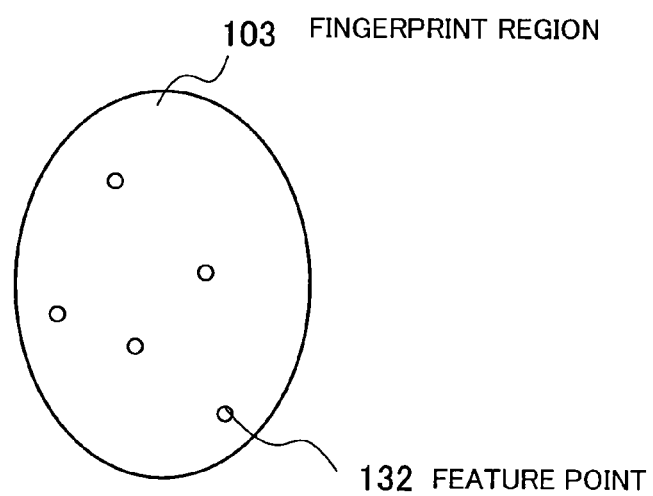
FIG. 15 is a diagram showing fingerprint data input secondly according to the second exemplary embodiment of the present invention.

FIG. 15 is a diagram showing fingerprint data secondly input according to the present exemplary embodiment. It is seen that five feature points 132 exist within a fingerprint region 103.

Figure 16:
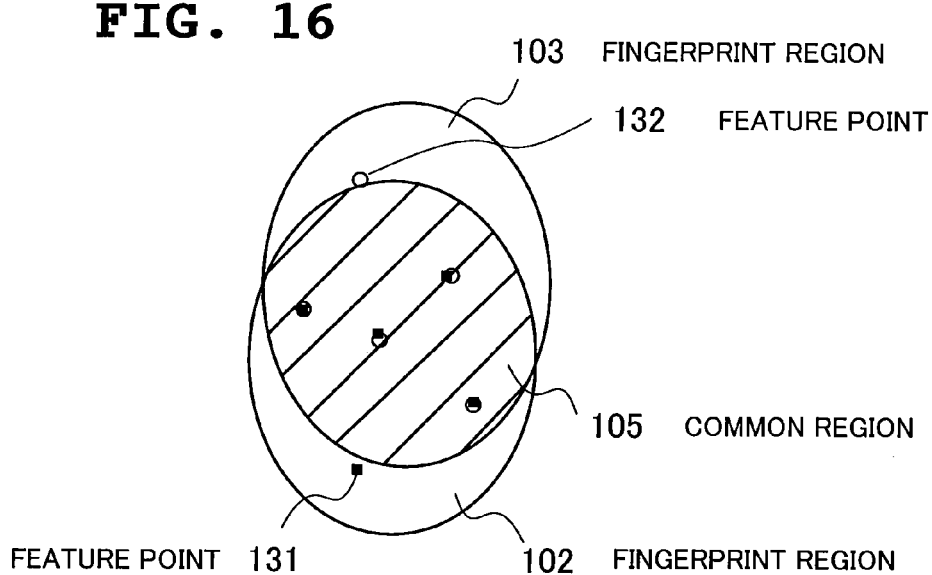
FIG. 16 is a diagram showing an example of extracting a common feature from two fingerprint data by a common feature extraction unit of the second exemplary embodiment of the present invention.

FIG. 16 is a diagram showing an example of extracting a common feature from two fingerprint data by the common feature extraction unit 35 according to the present exemplary embodiment.

With reference to FIG. 16, a region is seen common to the fingerprint region 102 of the fingerprint data input first and the fingerprint region 103 of the fingerprint data secondly input (hereinafter referred to as a common region 105). In addition, within the common region 105, four common feature points (hereinafter referred to as a common feature point) are arranged.

The common feature extraction unit 35 extracts the common region 105 and a common feature point 135 of the two fingerprint data (Step 1103).

Figure 17:
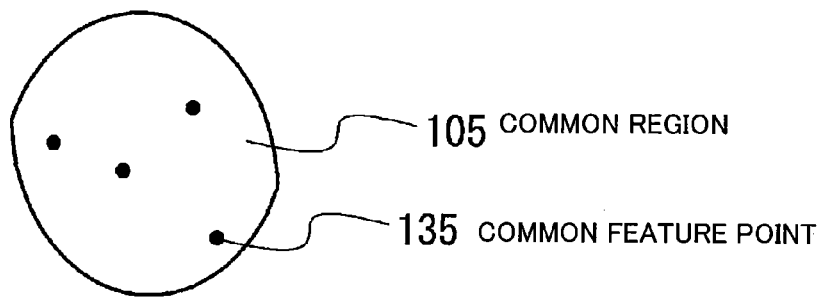
FIG. 17 is a diagram showing a common region and a common feature of two fingerprint data extracted by the common feature extraction unit of the second exemplary embodiment of the present invention.

FIG. 17 is a diagram showing the common regions 105 and the common feature points 135 of the two fingerprint data extracted by the common feature extraction unit 35 according to the present exemplary embodiment.

Next, the identification accuracy value calculation unit 31 calculates an identification accuracy value of the fingerprint data formed by the common region 105 and the common feature points 135 of the two fingerprint data (Step 1104).

The adequacy/inadequacy determination unit 32 compares the identification accuracy value calculated by the identification accuracy value calculation unit 31 and a predetermined threshold value (Step 1105).

As a result of the comparison between the identification accuracy value and the threshold value (Step 1106), when the identification accuracy value calculated by the identification accuracy value calculation unit 31 is smaller than the threshold value, that is, when than the threshold value, the identification accuracy value is smaller, determination is made that it is adequate fingerprint data with high identification accuracy (Step 1107).

To the fingerprint data determined to have high identification accuracy, a determination result to the effect that it is adequate is output by the output unit 40 (Step 1108).

Next, the registration unit 50 executes registration processing (Step 1109).

On the other hand, when the probability calculated by the identification accuracy value calculation unit 31 is larger than the threshold value, that is, when the identification accuracy value is larger than the threshold value, the adequacy/inadequacy determination unit 32 determines that it is not adequate fingerprint data with low identification accuracy (Step 1110).

To the fingerprint data determined to have low identification accuracy, a determination result to the effect that it is not adequate is output by the output unit 40 (Step 1111).

As described in the foregoing, a feature commonly included in the plurality of fingerprint data can be extracted to calculate an identification accuracy value.

Although the above-described example is an example where fingerprint data is input twice, the number of input may be three or more.

In addition, in a case where fingerprint data is input three times or more, because the common feature extraction unit 35 calculates an identification accuracy value by selecting a combination of two highly common pattern information data among the plurality of fingerprint data, even when the adequacy/inadequacy determination unit 32 determines that it is not adequate by twice of fingerprint data, the unit may in some cases determine that the fingerprint data is adequate at third and the following input. Therefore, sequential inputting until determination is made that fingerprint data is adequate enables calculation of an identification accuracy value whose reliability is high.

The foregoing described exemplary embodiment enables accurate calculation of an identification accuracy value.

The reason is that selection of a combination of a plurality of highly common pattern information data enables an effect exerted by variation of data to be mitigated.

While the first exemplary embodiment and the second exemplary embodiment set forth in the foregoing have been described with respect to coincidence and lack of coincidence of feature points based on a position of the feature points, identification accuracy can be calculated in more detail by adding other feature amount such as a ridge line with which a feature point is in contact.

In addition, while the first exemplary embodiment and the second exemplary embodiment set forth in the foregoing have been described with respect to a case where fingerprint data is used as pattern information, a palm print can be also used. Other pattern information can be used as well that enables an individual to be specified such as an iris, a face, shape of a palm or a vein pattern.

In a case where a face is used as pattern information, a specific part, e.g. an end portion of an eye or an end portion of a lip may be used as a feature point.

Figure 18:
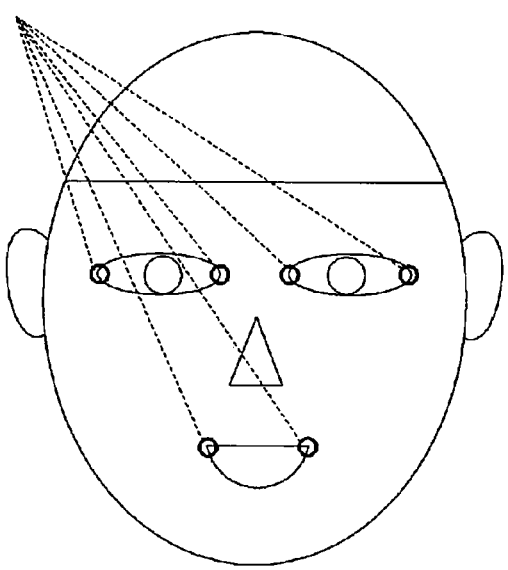
FIG. 18 is a diagram showing an example of a feature point in a case where a face is used as pattern information according to the second exemplary embodiment of the present invention.

FIG. 18 is a diagram showing an example of a feature point in a case where a face is used as pattern information according to the present exemplary embodiment. As shown in the figure, since an end portion of an eye or a lip is not always located evenly over the face, it is not possible to calculate an identification accuracy value by obtaining a probability that a position of a feature point arranged at random will coincide with arbitrary data as in the case of fingerprint data.

Figure 19:
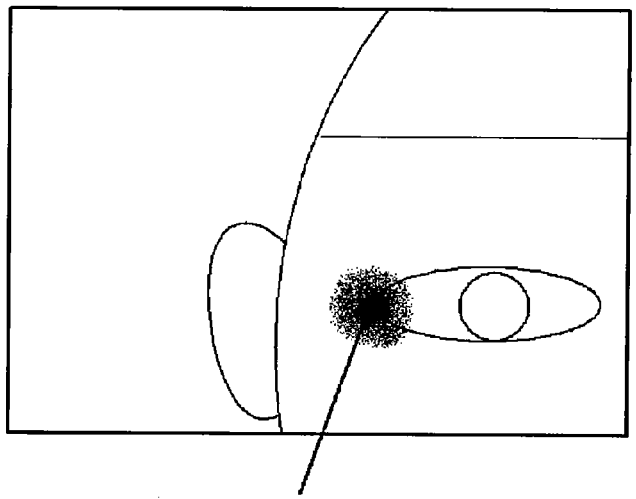
FIG. 19 is a diagram showing an example of a feature point in a case where a position of an end portion of an eye is used as pattern information according to the second exemplary embodiment of the present invention.

FIG. 19 is a diagram showing an example of a feature point in a case where a position of an end portion of an eye is used as pattern information according to the present exemplary embodiment. Point of the end portion in the figure indicates a distribution of positions at which the end portion of the eye appears (hereinafter abbreviated as an appearance distribution). The appearance distribution (appearance frequency) may be based on data of the past or on a probability of predicted occurrence of data (occurrence probability).

Unlike the case of a fingerprint, the position of an end portion of an eye will not appear evenly over the face. In such a case where positions of feature points are not evenly distributed as described above, it is only necessary to calculate a probability that pattern information data at the corner of the eye and arbitrary pattern information data will coincide assuming a case where the end portion of the eye is arranged according to a frequency of a position at which a specific portion appears as shown in FIG. 19.

It is also possible to calculate an identification accuracy value of pattern information such as a character and a pattern and use the value for registering these pattern information at a dictionary for collation.

Third Exemplary Embodiment

Next, a third exemplary embodiment of the present invention will be described with reference to the drawings.

Figure 20:
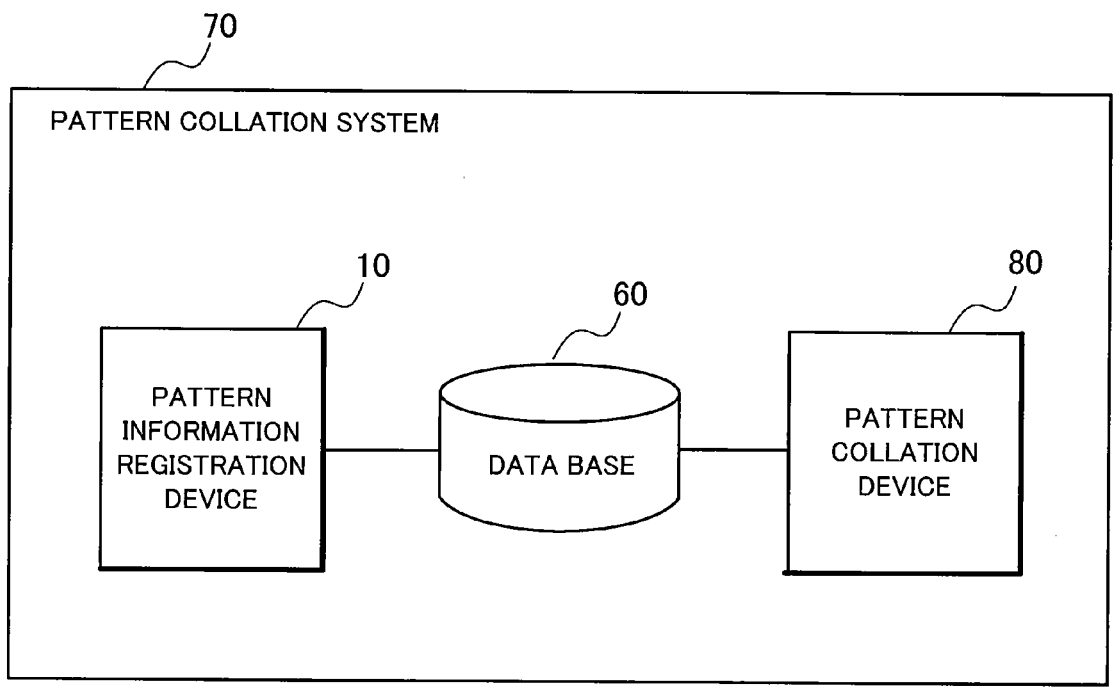
FIG. 20 is a block diagram showing a structure of a pattern collation system according to a third exemplary embodiment of the present invention.

FIG. 20 is a block diagram showing a structure of a pattern collation system 70 according to the present exemplary embodiment. In the following description, a main part of FIG. 1 will be referred to as required.

With reference to FIG. 20, the pattern collation system 70 according to the present exemplary embodiment comprises the pattern information registration device 10, the data base 60 and a pattern collation device 80. The pattern information registration device 10 and the pattern collation device 80 are connected through the data base 60.

The structure of the pattern information registration device 10 is the same as that of FIG. 1. With only a difference being that since the data base 60 is connected to the pattern collation device 80, it is disposed outside the pattern information registration device 10.

In addition, the pattern collation device 80 internally stores a plurality of pattern information data for collation which are already registered and upon input of pattern information data as an object of collation, specifies to which of the internally stored plurality of pattern information data the pattern information data in question corresponds.

Next, operation of the pattern collation system 70 according to the present exemplary embodiment will be described.

The pattern information registration device 10, as has been described in the first exemplary embodiment, determines adequacy/inadequacy of pattern information data input for registration, executes registration processing of pattern information data with high identification accuracy which has been determined to be adequate and stores the registered data (hereinafter abbreviated as registration data) in the data base 60.

The pattern collation device 80 reads registration data which is stored in the data base 60 to store the data in the pattern collation device 80 as data for collation.

By using the data for collation, the pattern collation device 80 specifies to which of the internally stored plurality of pattern information data, the pattern information input to the pattern collation device 80 corresponds.

In a case where the pattern collation device 80 is a fingerprint collation device 80, when fingerprint data is input, the fingerprint collation device collates the data with the internally stored fingerprint data and specifies data relevant to the fingerprint to determine whether it is a person in question or not.

While the above description has been made assuming that the pattern collation system 70 is one device, the pattern information registration device 10 and the pattern collation device 80 can be arranged at different places. In this case, the data base 60 can be arranged in the pattern information registration device 10 as shown in FIG. 1 to connect the pattern information registration device 10 and the pattern collation device 80 through a network.

A fourth exemplary embodiment is also characterized in forming the arbitrary pattern information data by arranging the above same number of feature points at random within a predetermined region of the pattern information data as an object of determination and when the above same number of feature points are respectively arranged in proximity to the feature points of the pattern information data as an object of determination, considering the arbitrary pattern information data to be coincident with the pattern information data as an object of determination to calculate the identification accuracy value.

When pattern information is used aiming at biometric identification, it is a common practice to first execute pattern registration and execute collation based thereon thereafter. At the time of the pattern registration, when identification accuracy of pattern information data to be registered is high, it is easy to discriminate from other large volume of pattern information data and on the other hand, when identification accuracy of data to be registered is low, it is difficult to discriminate from other large volume of data. It is accordingly demanded to obtain an identification accuracy value of pattern information data to be registered at the time of data registration by calculation to determine adequacy/inadequacy of pattern information data.

In the pattern information registration device of the present invention, with an identification accuracy value defined as a probability that pattern information data could not be discriminated from arbitrary pattern information data having the same number of feature points, the value is calculated with respect to pattern information data as an object of determination.

In the calculation of an identification accuracy value, first an image region and a feature point are extracted from pattern information data as an object of determination. Next, arbitrary data whose feature points are as many as those of the pattern information data as an object of determination is formed to calculate a probability that the pattern information data as an object of determination and the arbitrary data could not be discriminated from each other. Condition where the two data can not be discriminated occurs when the arbitrary data and the pattern information data to be registered coincide with each other. It is accordingly apparent that a probability that the pattern information data as an object of determination could not be discriminated from the arbitrary data is equal to a probability that the arbitrary data and the pattern information data as an object of determination will coincide with each other. It is derived from the foregoing that an identification accuracy value can be obtained by calculating a probability of coincidence.

In the present invention, the calculation for obtaining a probability of coincidence is executed in the following manner. Arbitrary data is formed by arranging at random as many feature points as feature points of pattern information data as an object of determination within an image region of the relevant pattern information data. When all the arranged feature points are located in proximity to the respective feature points of the pattern information data as an object of determination, it will be considered that the arbitrary data and the pattern information data as an object of determination coincide.

Probability of coincidence will be accordingly, when with a plurality of feature points existing within an image region, as many feature points as the existing feature points are arranged at random within the relevant image region, a probability that all of as many feature points are arranged in proximity to the plurality of feature points, respectively. The probability can be calculated by designating, with a proximity of a feature point assumed to be within a circle centered around the feature point, a radius of the relevant circle, an area of the image region and the number of feature points.

Thus, determination of adequacy/inadequacy of pattern information data is made by calculating an identification accuracy value of the pattern information data and comparing the value with a threshold value.

The pattern information registration devices 10 and 15 of the present invention have their operation realized not only as hardware but also as software by executing a pattern information registration program (application) 300 which executes each of the above-described functions on the pattern information registration devices 10 and 15 as computer processing devices. The pattern information registration program 300 is stored in a magnetic disk, a semiconductor memory or other recording medium and loaded into the pattern information registration devices 10 and 15 from the recording medium to control their operation, thereby realizing each of the above-described functions.

An exemplary advantage according to the present invention is enabling selection of pattern information data appropriate for pattern collation.

The reason is that by calculating an identification accuracy value of pattern information data, adequacy/inadequacy of identification accuracy of the pattern information data is determined.

Another exemplary advantage is enabling pattern information data suitable for pattern collation to be selected irrespective of the amount of information of pattern information data (e.g. the number of feature points).

The reason is that an identification accuracy value is calculated according to the amount of information of the pattern information data.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-011372, filed on Jan. 19, 2005, the disclosure of which is incorporated herein in its entirety by reference.

The invention claimed is:

1. A pattern information registration device for selecting and registering pattern information data as an object for determination of registration for use in pattern collation, comprising:
   means for forming arbitrary pattern information data having a feature point;
   means for calculating an identification accuracy value indicative of a degree of coincidence between said pattern information data as an object for determination and said arbitrary pattern information data and determining whether said pattern information data as an object for determination is adequate for registration or not based on the identification accuracy value, wherein
   when said identification accuracy value fails to exceed a threshold value, determines that said pattern information data is adequate and when the value exceeds said threshold value, determines that said pattern information data is inadequate to execute registration processing of pattern information data determined to be adequate;

wherein said threshold value is smaller than or equal to a false match rate of an authentication device for use in authentication of biometric information that specifies an individual.

2. The pattern information registration device according to claim 1, wherein
said forming means forms said arbitrary pattern information data by arranging feature points at random within a predetermined region of said pattern information data as an object for determination, and
when said feature points are arranged in proximity to feature points of said pattern information data as an object for determination, said calculating means calculates said identification accuracy value by considering that said arbitrary pattern information data coincides with said pattern information data as an object for determination.

3. The pattern information registration device according to claim 2, wherein the proximity of said feature points is within a circle around a position of said feature points of said pattern information data as an object for determination.

4. The pattern information registration device according to claim 1, comprising an identification accuracy value calculation unit which calculates an identification accuracy value of said pattern information data.

5. The pattern information registration device according to claim 1, comprising an adequacy/inadequacy determination unit which determines adequacy/inadequacy of said pattern information data.

6. The pattern information registration device according to claim 1, wherein said pattern information data is obtained through a network.

7. The pattern information registration device according to claim 1, wherein said pattern information data is fingerprint data.

8. The pattern information registration device according to claim 7, wherein a fingerprint region or number of feature points included in said fingerprint data are extracted.

9. The pattern information registration device according to claim 8, wherein said feature point is an end point of a fingerprint ridge line or a branch point of a fingerprint ridge line.

10. The pattern information registration device according to claim 8, wherein a radius of a circle centered around the position of said feature point is set to be a value smaller than a radius of a circle corresponding to one-tenth an area calculated by dividing an area of said fingerprint region by the number of said feature points.

11. The pattern information registration device according to claim 7, wherein said fingerprint data is input by a fingerprint sensor.

12. The pattern information registration device according to claim 1, which forms said arbitrary pattern information data by arranging feature points within a predetermined region of said pattern information data as an object for determination according to a feature point occurrence distribution obtained in advance and when said feature points are arranged in proximity to feature points of said pattern information data, respectively, considers that said arbitrary pattern information data coincides with said pattern information data as an object for determination to calculate said identification accuracy value.

13. The pattern information registration device according to claim 12, wherein said pattern information data is palm print data, iris data, face data, palm shape data, vein pattern data, character data or pattern data.

14. The pattern information registration device according to claim 13, wherein a feature point of said face data is an end portion of an eye or an end portion of a lip.

15. The pattern information registration device according to claim 1, wherein as said feature point, a feature point included in common in a plurality of pattern information data corresponding to a same pattern information is used.

16. The pattern information registration device according to claim 15, comprising a common feature extraction unit for extracting commonness.

17. A pattern information registration method of selecting and registering pattern information data as an object for determination of registration for use in pattern collation, including the following steps carried out by a computer processing device:
forming arbitrary pattern information data having a feature point,
calculating an identification accuracy value indicative of a degree of coincidence between said pattern information data as an object for determination and said arbitrary pattern information data, and
determining whether said pattern information data as an object for determination is adequate for registration or not based on the identification accuracy value, wherein
determining that said pattern information data is adequate when said identification accuracy value fails to exceed said threshold value and determining that said pattern information data is inadequate when the value exceeds said threshold value to execute registration processing of pattern information data determined to be adequate,
wherein said threshold value is smaller than or equal to a false match rate required of an authentication device for use in authentication of biometric information that specifies an individual.

18. The pattern information registration method according to claim 17, wherein
forming said arbitrary pattern information data by arranging feature points at random within a predetermined region of said pattern information data as an object for determination, and
when said feature points are arranged in proximity to feature points of said pattern information data as an object for determination, considering that said arbitrary pattern information data coincides with said pattern information data as an object for determination to calculate said identification accuracy value.

19. The pattern information registration method according to claim 18, wherein the proximity of said feature points is within a circle around a position of said feature points of said pattern information data as an object for determination.

20. The pattern information registration method according to claim 17, wherein said pattern information data is fingerprint data.

21. The pattern information registration method according to claim 20, wherein a fingerprint region or number of feature points included in said fingerprint data are extracted.

22. The pattern information registration method according to claim 21, wherein said feature point is an end point of a fingerprint ridge line or a branch point of a fingerprint ridge line.

23. The pattern information registration method according to claim 21, wherein a radius of a circle centered around the position of said feature point is set to be a value smaller than a radius of a circle corresponding to one-tenth an area calculated by dividing an area of said fingerprint region by the number of said feature points.

24. The pattern information registration method according to claim 20, wherein said fingerprint data is input by a fingerprint sensor.

25. The pattern information registration method according to claim 17, wherein as said feature point, is a feature point included in common in a plurality of pattern information data corresponding to a same pattern information is used.

26. The pattern information registration method according to claim 17, wherein said pattern information data is obtained through a network.

27. The pattern information registration method according to claim 17, including:
forming said arbitrary pattern information data by arranging feature points within a predetermined region of said pattern information data as an object for determination according to a feature point occurrence distribution obtained in advance, and when said feature points are arranged in proximity to feature points of said pattern information data, respectively, considering that said arbitrary pattern information data coincides with said pattern information data as an object for determination to calculate said identification accuracy value.

28. The pattern information registration method according to claim 27, wherein said pattern information data is palm print data, iris data, face data, palm shape data, vein pattern data, character data or pattern data.

29. The pattern information registration method according to claim 28, wherein a feature point of said face data is an end portion of an eye or an end portion of a lip.

30. A non-transitory computer-readable medium storing a pattern information registration program executed on a computer processing device for selecting and registering pattern information data as an object for determination of registration for use in pattern collation, which causes said computer processing device to
form arbitrary pattern information data having a feature point, calculate an identification accuracy value indicative of a degree of coincidence between said pattern information data as an object for determination and said arbitrary pattern information data, and determine whether said pattern information data as an object for determination is adequate for registration or not based on the identification accuracy value,
wherein including the function of determining that said pattern information data is adequate when said identification accuracy value fails to exceed said threshold value and determining that said pattern information data is inadequate when the value exceeds said threshold value to execute registration processing of pattern information data determined to be adequate,
wherein said threshold value is smaller than or equal to a false match rate of an authentication device for use in authentication of biometric information that specifies an individual.

31. The non-transitory computer-readable medium storing said pattern information registration program according to claim 30, including the functions of:
forming said arbitrary pattern information data by arranging feature points at random within a predetermined region of said pattern information data as an object for determination, and when said feature points are arranged in proximity to feature points of said pattern information data as an object for determination, considering that said arbitrary pattern information data coincides with said pattern information data as an object for determination to calculate said identification accuracy value.

32. The non-transitory computer-readable medium according to claim 31, wherein the proximity of said feature points is within a circle around a position of said feature points of said pattern information data as an object for determination.

33. The non-transitory computer-readable medium storing said pattern information registration program according to claim 30, wherein said pattern information data is fingerprint data, and which comprises the function of extracting a fingerprint region or number of feature points included in said fingerprint data.

34. The non-transitory computer-readable medium storing said pattern information registration program according to claim 33, including the function of making said feature point as an end point of a fingerprint ridge line or a branch point of a fingerprint ridge line.

35. The non-transitory computer-readable medium according to claim 33, including the function of setting a radius of a circle centered around the position of said feature point to be a value smaller than a radius of a circle corresponding to a one-tenth of an area calculated by dividing an area of said fingerprint region by the number of said feature points.

36. The non-transitory computer-readable medium according to claim 33, including the function of inputting said fingerprint data by a fingerprint sensor.

37. The non-transitory computer-readable medium storing said pattern information registration program according to claim 30, wherein as said feature point, a feature point included in common in a plurality of pattern information data corresponding to a same pattern information is used.

38. The non-transitory computer-readable medium according to claim 30, comprising the function of obtaining said pattern information data through a network.

39. The non-transitory computer-readable medium according to claim 30, including the function of:
forming said arbitrary pattern information data by arranging feature points within a predetermined region of said pattern information data as an object for determination according to a feature point occurrence distribution obtained in advance, and when said feature points are arranged in proximity to feature points of said pattern information data, respectively, considering that said arbitrary pattern information data coincides with said pattern information data as an object for determination to calculate said identification accuracy value.

40. A pattern collation system comprising a pattern information registration device for selecting and registering pattern information data as an object for determination of registration for use in pattern collation and a pattern collation device for executing pattern collation processing, wherein
said pattern information registration device forms arbitrary pattern information data having a feature point and calculates an identification accuracy value indicative of a degree of coincidence between said pattern information data as an object for determination and said arbitrary pattern information data, and determining whether said pattern information data as an object for determination is adequate for registration or not based on the identification accuracy value,
wherein when said identification accuracy value fails to exceed a threshold value, said pattern information registration device determines that said pattern information data is adequate and when the value exceeds said threshold value, determines that said pattern information data is inadequate to execute registration processing of pattern information data determined to be adequate,
wherein said threshold value is smaller than or equal to a false match rate of an authentication device for use in authentication of biometric information that specifies an individual.

41. The pattern collation system according to claim 40, wherein data registered by said registration processing is supplied from said pattern information registration device to said pattern collation device, and said pattern collation device executes collation processing of pattern information data input for collation by using said registered data.

* * * * *

UNITED STATES PATENT AND TRADEMARK OFFICE
CERTIFICATE OF CORRECTION

PATENT NO. : 8,358,814 B2  Page 1 of 1
APPLICATION NO. : 11/814362
DATED : January 22, 2013
INVENTOR(S) : Akira Monden It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1201 days.

Signed and Sealed this

First Day of September, 2015

Michelle K. Lee
*Director of the United States Patent and Trademark Office*